United States Patent Office 3,448,450
Patented June 3, 1969

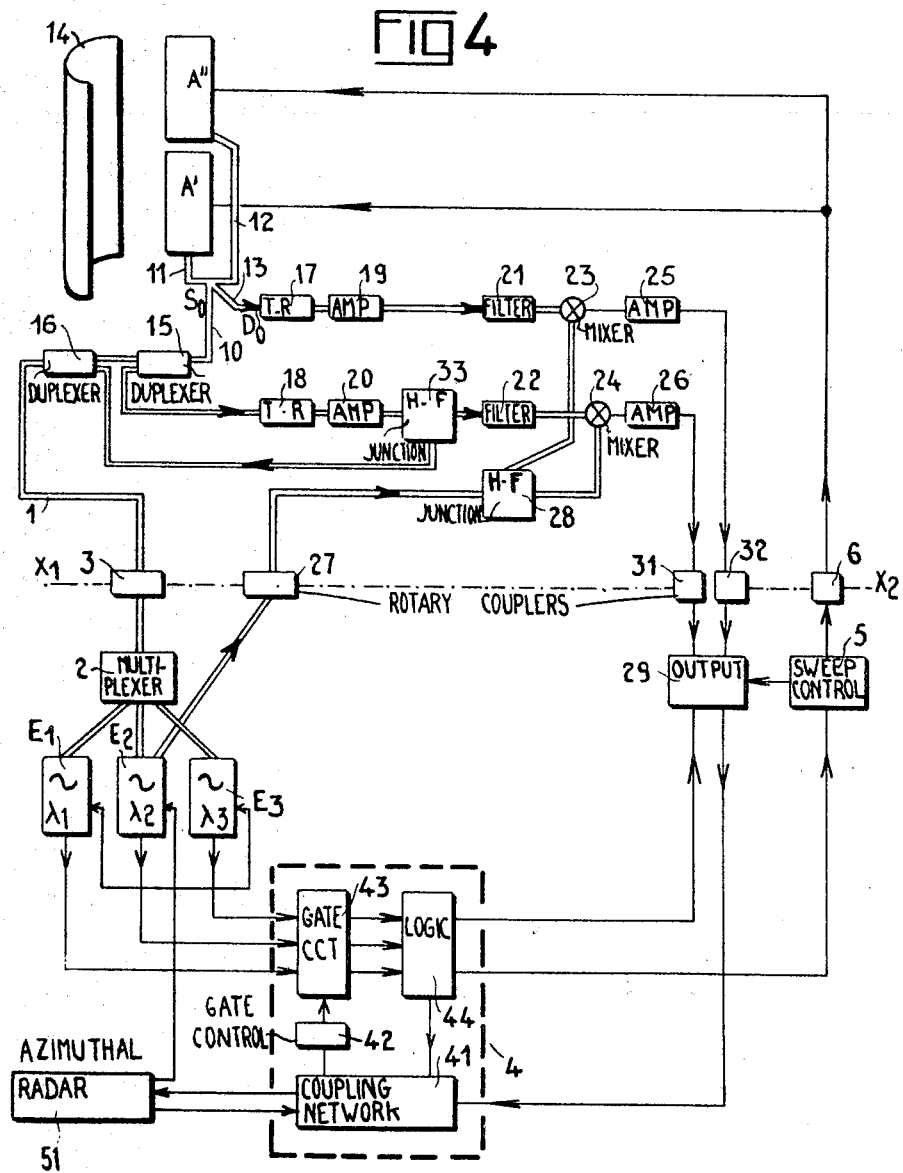

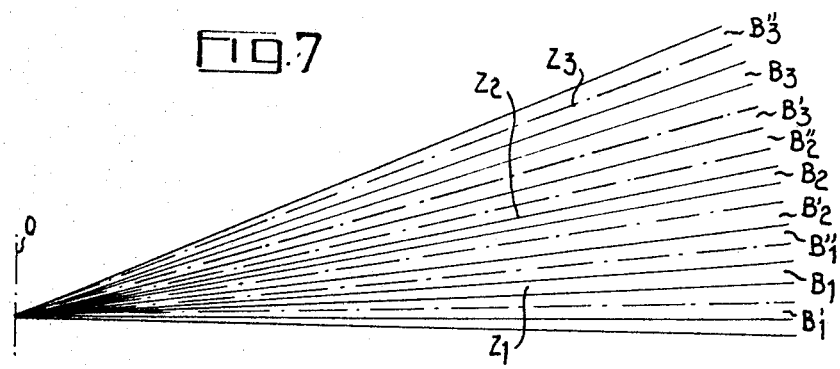
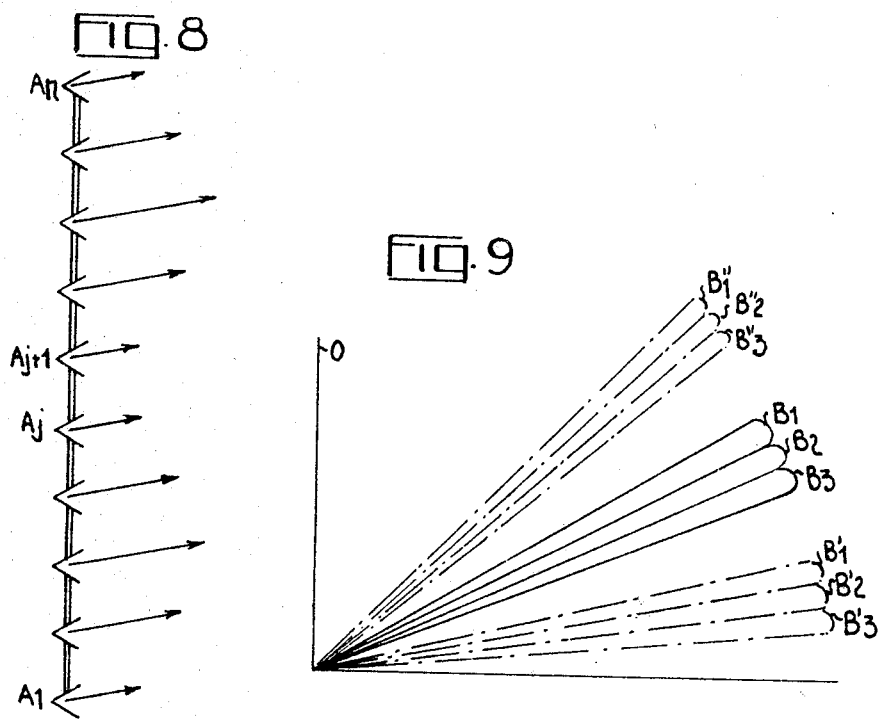

3,448,450
PULSE RADAR FOR DETERMINING ANGLES OF ELEVATION
Roger Alfandari, Paris, and Bernard Daveau, Orsay, France, assignors to Compagnie Francaise Thomson-Houston-Hotchkiss Brandt, Paris, France, a corporation of France
Filed Aug. 29, 1967, Ser. No. 664,193
Claims priority, application France, Sept. 1, 1966, 74,889
Int. Cl. G01s 9/02
U.S. Cl. 343—16                                                     12 Claims

ABSTRACT OF THE DISCLOSURE

A stack of vertically spaced radar antennas, effective over a narrow azimuthal range, are simultaneously energized, with a plurality of pulse carrier frequencies common to all antennas, through respective phase shifters whose phase shifts are chosen to establish a desired multilobe pattern, each carrier frequency generating an individual lobe with its axis inclined at a particular angle of elevation. These angles are varied, within relatively narrow vertical ranges, by concurrent adjustment of the several phase shifters whereby the multilobe pattern sweeps an extended vertical sector. With a three-lobe pattern, the central lobe may be used for the tracking of a target while the flanking lobes serve, in cooperation with an associated azimuthal radar, to keep the system centered on the target.

---

Our present invention relates to a pulse-type radar system adapted to be used, e.g. in combination with a conventional azimuthal or panoramic radar, to ascertain the angle of elevation of microwave energy reflected from external objects and, thereby, to determine the altitude of those objects.

A system of this type is useful for monitoring purposes, to give an observer a complete three-dimensional picture of the locations of aircraft or other elevated objects within a particular sector or over the entire horizon, as well as for the tracking of a particular target, e.g. when the system is carried aboard a missile.

The general object of our present invention is to provide an improved radar system of the type referred to which sharply discriminates among different angles of elevation while using only a limited band of carrier frequencies.

Another object of our invention is to provide a radar system of this character which, by virtue of its sharp angular directivity, can be used to supplement the information gained from an associated panoramic radar, particularly in regard to the presence of low-flying craft at great distances (up to several hundreds of kilometers) from the observer.

It is also an object of the instant invention to provide means in such radar system for minimizing the fading effect normally encountered in certain positions of a target with reference to an array of radar antennas trained thereon.

In accordance with an important feature of our present invention, we provide an altitude-measuring radar system wherein a stack of vertically spaced radar antennas, effective over a narrow azimuthal range, are simultaneously energized with one or more pulsed carried frequencies by way of respective phase shifters so arranged that the microwave energy of a particular carrier frequency is radiated, within a given vertical plane, in a pattern whose main lobe is inclined at a predetermined angle of elevation related to the carrier frequency as well as to the introduced phase shifts; in the presence of several different carrier frequencies, a multilobe pattern ensues. By controlledly varying the aforementioned phase shifts, we can angularly displace the principal lobe or lobes of the pattern within a sectoral range whereby a continuous sector, within the selected vertical plane, is rapidly scanned by one or more sharply directive beams. With the antennas acting as both radiators and receivers, the array has the same sharp directivity for incoming radiation. By a rotatable mounting of the array, its effective plane can be changed, advantageously in step with the azimuthal sweep of an associated panoramic radar.

For monitoring purposes, the echo pulses received on each carrier frequency may be separately evaluated (e.g. fed to a display device) for locating reflecting objects in different sectoral zones of the elevational sweep range; in an alternate arrangement, a three-lobe pattern may be used for tracking a specific target in a given azimuthal position, with the central lobe furnishing the altitude information of such target while the flanking lobes serve to reorient the multilobe pattern by so altering the phase shifts as to keep the central lobe trained on the target with changing angles of elevation. The initial orientation of the pattern in each azimuthal position may be determined by a computer under the control of an associated panoramic radar.

In order to maximize the response of the system to incoming echo pulses from a selected target, we prefer to subdivide the stack of antennas into two vertically spaced groups from which incoming energy is directed with additive and subtractive phase relationship into separate output channels, such as two conjugate branches of a waveguide junction of the magic-T type. It is also possible to use two parallel waveguides having junctions for the additive and subtractive combination, respectively, of wave energies from the two groups. The waveguide junctions may have different coupling factors or transfer coefficients to provide a desirable distribution of microwave amplitudes over the length of the array, or of a group thereof, with a maximum energy transmission and reception at the center of the array or group.

The invention will be described in greater detail with reference to the accompanying drawing in which:

FIG. 4 is a view similar to FIG. 1, showing a modified system;

FIG. 7 illustrates the radiation pattern realizable with a system according to our invention;

FIG. 8 diagrammatically illustrates a preferred pattern of amplitude distribution in a system according to our invention; and FIG. 9 is a diagram similar to FIG. 7, showing an alternative sweep pattern.

Figure 1:
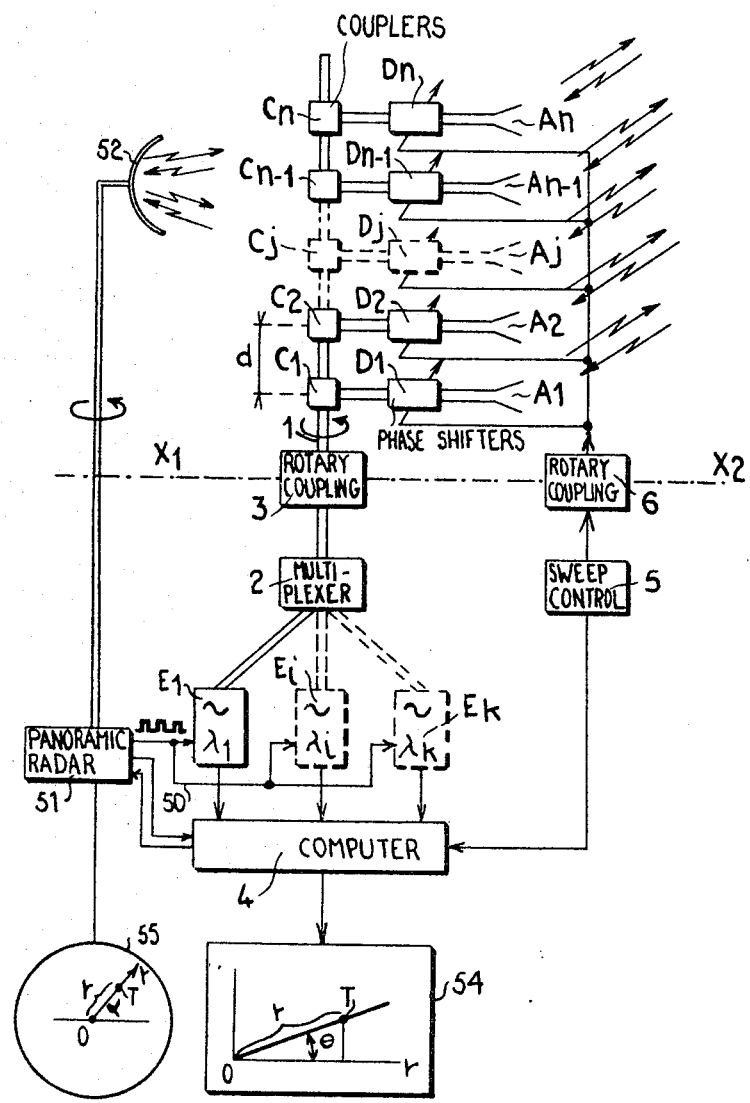
FIG. 1 is a diagrammatic view of a radar system embodying our invention.

In FIG. 1 we have shown a stack of a multiplicity of radar antennas designated $A_1$, $A_2$ ... $A_j$ ... $A_{n-1}$, $A_n$. Each of these antennas, serving for the transmission and reception of microwave energy, is sharply directive in a horizontal plane and may be in the shape of a conventional dipole, coil, dielectric tube and so forth. The antennas form part of a rotatable assembly whose vertical axis of rotation, indicated at 0 in FIGS. 7 and 9, may pass through these antennas or in the vicinity thereof.

The assembly may also include a common reflector, as shown at 14 in FIG. 4, in the shape of a parabolic cylinder segment focused on the antenna stack. The elements included in the rotatable assembly are shown located in FIG. 1 above a horizontal line $X_1$–$X_2$. They further include a waveguide 1 having junctions $C_1$, $C_2$ ... $C_j$ ... $C_{n-1}$, $C_n$ respectively coupled with the antennas $A_1$ ... $A_n$ through individual phase shifters $D_1$, $D_2$ ... $D_j$ ... $D_{n-1}$, $D_n$. Each of these couplers may consist of a pair of oppositely directive junctions to reduce the standing-wave ratio. The radiated energy may be circularly or linearly polarized or may be switched between these two types of polarization.

Waveguide 1 is connected through a rotary coupler 3 and a multiplexer 2 to a set of microwave oscillators $E_1$ ... $E_i$ ... $E_k$ operating on different wavelengths $\lambda_1$ ... $\lambda_i$ ... $\lambda_k$. These oscillation generators are pulsed via a lead 50 in synchronism with the pulse source (not shown) of a panoramic radar 51 which may operate in a different frequency band and whose antenna or antennas 52 are rotatable in unison with the antennas $A_1$ ... $A_n$ and associated elements of the altitude-measuring radar. The carrier frequencies from these oscillators further serve for the demodulation of received wave energy, the demodulated echo pulses being fed to a computer 4 which is also under the control of the panoramic radar 51.

Another rotary coupler 6 connects a sweep-control circuit 5 to a cable 53 consisting of a bank of individual conductors respectively connected to the phase shifters $D_1$ ... $D_n$ for controlling the extent of the phase shifts introduced thereby. The output of control circuit 5 is also supplied to the computer 4. From this information, the computer operates the deflectors of a cathode-ray tube 54 whose screen shows the distance $r$ and the angle of elevation $\theta$ of a target T whose location, in terms of distance $r$ and azimuthal angle $\alpha$, is also seen on a panoramic oscilloscope screen 55 controlled by the radar 51.

The azimuthal directivity of the antenna array $A_1$ ... $A_n$ should be such as to allow for the scanning of an entire elevational sector in any horizontal position as determined by the power of resolution of the panoramic radar 51.

With suitable adjustment of the phase shifters $D_1$ ... $D_n$ the vertical radiation pattern of antennas $A_1$ ... $A_n$ exhibits as many principal lobes as there are carrier oscillators $E_1$ ... $E_k$. The axis of each lobe includes a characteristic angle of elevation, $\theta_1$ ... $\theta_k$, with the horizontal, the magnitude of this angle being determined in part by the corresponding carrier wavelength $\lambda_1$ ... $\lambda_k$ and in part by the relative phase shift between adjoining antennas of the array. (It will be understood, in this connection, that the linear array of antennas $A_1$ etc. may be replaced by a two-dimensional array, with each aerial shown in FIG. 1 representative of a plurality of such aerials disposed side by side.)

Figure 5:
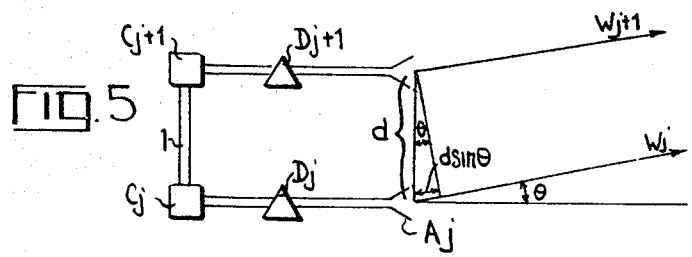
FIG. 5 is a diagram serving to explain the mathematical principles underlying our invention.

As illustrated in FIG. 5, two outgoing wave components $W_j$, $W_{j+1}$, traveling in a direction which has the angle of inclination $\theta$, will be in phase if their respective emitters $A_j$, $A_{j+1}$ operate with a phase difference equal to the length in radians of the path difference $d \cdot \sin \theta$, $d$ being the physical distance between radiators $A_j$ and $A_{j+1}$. It may be assumed that the distance $d$ is constant throughout the array, this condition simplifying the calculations while being not otherwise essential.

If the transmitted frequency has a propagation wavelength $\lambda_g$ along the waveguide 1, the phase difference $\Delta\psi$ between successive junctions $C_j$, $C_{j+1}$ is equal to $2\pi d/\lambda_g$, with $$\lambda_g = \frac{\lambda}{\sqrt{\lambda_c^2 - \lambda^2}}$$

where $\lambda$ is the free-space wavelength of the applied carrier oscillation and $\lambda_c$ is the cutoff wavelength of the waveguide. If the phase shifters $D_j$, $D_{j+1}$ introduce an additional phase displacement $\Delta\psi_v$ (variable under the control of circuit 5, FIG. 1), the value of angle $\theta$ can be determined from the relationship $$\sin \theta = \frac{\Delta\varphi \lambda}{2\pi d}$$

where $\Delta\varphi = \Delta\psi + \Delta\psi_v$. Thus, a change of either $\Delta\psi_v$ or $\lambda$ will vary the angle $\theta$. The formula also shows, however, that the change of $\theta$ is not proportional to the change in phase shift so that, in practice, the sweep range available by adjustment of the phase shifters $D_j$ etc. is limited. This limitation is compensated by the fact that several discrete carrier frequencies are simultaneously available to scan different sectoral zones $Z_1$, $Z_2$, $Z_3$ etc. as illustrated in FIG. 7. With proper choice of these carrier frequencies, the zone $Z_1$ swept by the lobe $B_1$ (corresponding to the shortest wavelength $\lambda_1$) immediately adjoins the zone $Z_2$ assigned to lobe $B_2$ (operating wavelength $\lambda_2$), the latter in turn being contiguous to zone $Z_3$ (wavelength $\lambda_3$). The beam width of these lobes may be regarded as bounded by, say, the $-3$ db level of its signal strength. The extreme sweep positions of each beam $B_1$, $B_2$, $B_3$ have been shown at $B_1'$, $B_1''$; $B_2'$, $B_2''$; and $B_3'$, $B_3''$.

Figure 6:
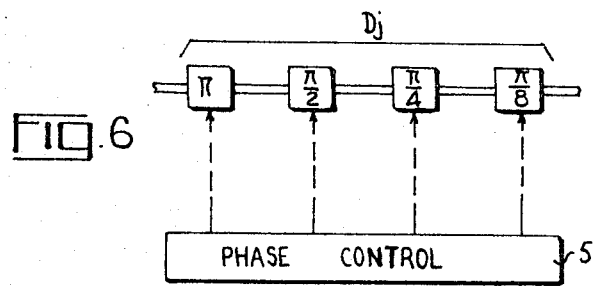
FIG. 6 is a schematic view of a phase shifter forming part of the systems of FIGS. 1 and 4.

The phase shifters may be of a conventional, continuously adjustable type comprising, for example, ferrite cores or controlled rectifiers. They may, however, also be binary combinations of fixed phase-shifting devices, as illustrated in FIG. 6 where phase shifter $D_j$ is shown to consist of four stages with individual phase shifts equal to $\pi$, $\pi/2$, $\pi/4$ and $\pi/8$, respectively, with possible addition of further stages having incremental values equal to $\pi$ divided by higher powers of 2. These stages may be selectively actuated, under the control of circuit 5, at the beginning of each radar pulse cycle for a progressive phase displacement.

By the use of phase-shifting means rather than variable-frequency generators for the purpose of angularly displacing the multilobe pattern, particularly with incremental phase shifts through a digital chain as shown in FIG. 6, the number of sidebands is held to a minimum.

Figure 2:
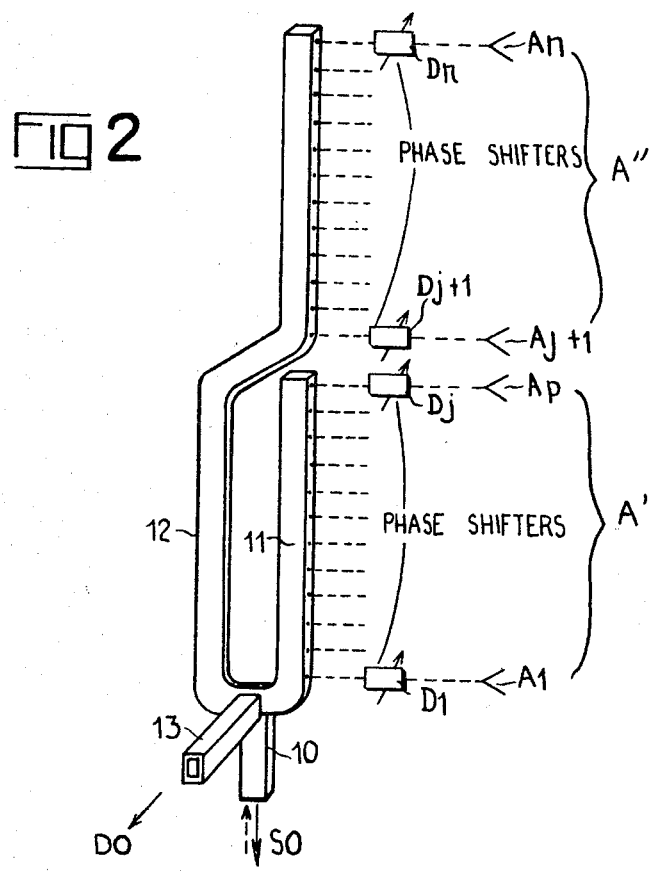
FIG. 2 is a perspective view of a branched waveguide adapted to be used in the system of FIG. 1.

In FIG. 2 we have shown a modified waveguide 10 for the energization of antennas $A_1$ ... $A_n$ and the retrieval of their incoming microwave energy. This waveguide splits into two branches 11 and 12 respectively coupled to the group $A'$ of aerials $A_1$ ... $A_j$ (via phase shifters $D_1$ ... $D_j$) and to the group $A''$ of aerials $A_{j+1}$ ... $A_n$ (via phase shifters $D_{j+1}$ ... $D_n$). The top aerial $A_j$ of the lower group $A'$ and the bottom aerial $A_{j+1}$ of the upper group $A''$ may be spaced from each other by the aforementioned distance $d$, representing the separation of any two adjoining aerials within each group, though the intergroup spacing could also be different. The associated phase shifters $D_1$ ... $D_n$ are however, correlated in the aforedescribed manner to establish a single preferred direction of radiation, throughout the array $A_1$ ... $A_n$, for any one operating wavelength.

Branches 11 and 12 are joined to each other, and to the common guide portion 10, by a conventional magic-T junction from which a further channel 13 extends in conjugate relationship with channel 10. Incoming radiation of a given frequency, reflected by an external object toward the two antenna groups, is combined additively in guide channel 10 and subtractively in guide channel 13 to provide a summative output SO and a differential output DO. Depending on the relative transit time between the object and the two antenna groups, either the summative output SO or the differential output DO may predominate; from a combination of these outputs the computer may obtain accurate information on the location of the object.

The waveguide sections 11, 12 are terminated at the top by suitable nonreflective loss material, not shown; such termination is, of course, also provided at the top of waveguide 1 in FIG. 1.

The transfer coefficients of the couplers $C_1 \ldots C_n$ (FIG. 1), not shown in FIG. 2, may be so chosen that the amplitudes of the outgoing waves (and therefore also the sensitivity of the system for incoming waves) follow a predetermined pattern, with a maximum radiation near the midpoint of the array (FIG. 1) or each group (FIG. 2). This has been diagrammatically illustrated, with particular reference to the arrangement of FIG. 2, in FIG. 8 which also shows the cophasal relationship of the waves transmitted in a predetermined direction of propagation. It may be mentioned in this connection that such parallel relationship need not always be exactly maintained but that, for example, the phase shifts introduced between the couplers and the antennas may be slightly modified to provide, instead, a convergence of the directions of cophasal propagation upon an object at close range. Conversely, a slight divergence may be desirable in certain instances, e.g. for locating an extended object or group of objects.

Figure 3:
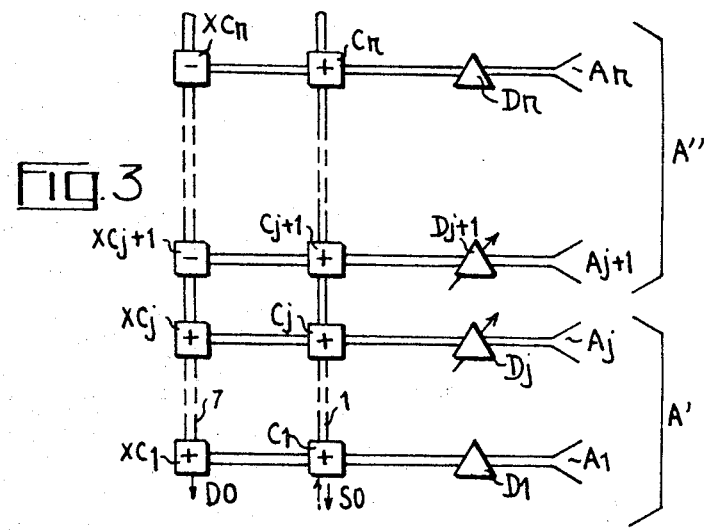
FIG. 3 is a diagrammatic view of two parallel waveguides usable as a substitute for the branched waveguide of FIG. 2.

The combination of a summative and a differential output may also be obtained with an arrangement as illustrated in FIG. 3 wherein the waveguide 1 of FIG. 1 is supplemented by a second waveguide 7 parallel thereto. Junctions $C_1 \ldots C_j$ of antenna group $A'$ are connected to waveguide 7 via additional junctions $XC_1 \ldots XC_j$, respectively, whereas junctions $C_{j+1} \ldots C_n$ of antenna group $A''$ are connected to waveguide 7 by way of additional junctions $XC_{j+1} \ldots XC_n$, respectively, with a phase reversal relative to junctions $XC_1 \ldots XC_j$. Waveguide 7, therefore, delivers a subtractive or differential output DO whereas waveguide 1, as in FIG. 1, supplies an additive or summative output SO.

Reference will now be made to FIG. 4 for a description of a tracking system generally similar to the one shown in FIG. 1 using a split antenna array $A'$, $A''$ as shown in FIG. 2 together with the parabolic reflector 14 previously referred to. Three frequency generators $E_1$, $E_2$, $E_3$ with respective operating wavelengths $\lambda_1$, $\lambda_2$, $\lambda_3$ are shown connected to waveguide 10 via multiplexer 2, rotary coupler 3, waveguide 1 and a pair of duplexers 16, 15 in cascade, duplexer 15 also receiving the additive output SO from waveguide 10 and directing it via an isolating transmit-receive unit 18 and a parametric amplifier 20 to a high-frequency junction 33 whence this output energy is returned to the frequency generators $E_1$, $E_2$, $E_3$ by way of duplexer 16 and elements 3 and 2. The provision of loop 15, 18, 20, 33, 16 appreciably reduces the noise level as compared with a simple two-way transmission through a waveguide 1, 10 as indicated in FIG. 1. Oscillators $E_1$, $E_2$, $E_3$, pulsed as in the previous embodiment under the control of an azimuthal radar 51, again serve also as demodulators and supply the echo-pulse signals to a logic network 44 by way of respective gates within a circuit 43 which is under the control of a selector 42. Elements 42, 43, 44 are part of the computer 4 which also includes a coupling circuit 41 for the control of gate selector 42 in response to information from radar 51, logic network 44 designed to keep the central lobe (wavelength $\lambda_2$) trained upon a selected target, and an output network 29 which acts as a monpulse interpolator in evaluating the target information contained in a combination of signals derived from the summative and differential outputs SO and DO of antenna array $A'$, $A''$. For this purpose, waveguide channel 13 is connected by way of an isolating transmit-receive network 17, a parametric amplifier 19 and a filter 21 to a mixer 23, receiving a local oscillation from generator $E_2$ through a rotary coupler 27 and a high-frequency junction 28; the latter junction also feeds a mixer 24 receiving incoming energy from waveguide 10 through elements 15, 18, 20, 33 and a filter 22. The I-F outputs of mixers 23 and 24 reach the network 29 through respective amplifiers 25, 26 and rotary couplers 32, 31. Sweep control circuit 5, responding to signals from logic network 44, supplies altitude information to the network 29.

The operation of the system of FIG. 4 will be explained with reference to the diagram of FIG. 9 which shows the lobes $B_1$, $B_2$, $B_3$ occupying adjacent positions in the vertical sweep plane. The group of lobes $B_1$, $B_2$, $B_3$ can be jointly displaced, through adjustment of the phase shifts of elements $D_1 \ldots D_n$ (FIG. 2), into different angular positions such as those shown at $B_1'$, $B_2'$, $B_3'$ and $B_1''$, $B_2''$, $B_3''$. Thus, the overlapping sweep zones of FIG. 9 (like the contiguous sweep zones of FIG. 7) establish, within that vertical plane, a coherent sectoral scan ranging from position $B_3'$ to position $B_1''$.

If the central lobe $B_2$ of the radiation pattern is properly trained upon a target to be tracked, logic network 44 receives an output from demodulator $E_2$ and keeps the gating circuit 43 operative, via circuits 41 and 42, to pass that output. If, within a given azimuthal position of the system and at a target distance indicated by radar 51, no echo pulses are received on wavelength $\lambda_2$, network 44 causes the circuit 43 to switch to demodulators $E_1$ and $E_3$ for determining whether the target is located below or above the central lobe. Sweep-control circuit 5 then operates to recenter the lobe $B_2$, associated with generator $E_2$, on the target by varying the phase shifts of the wave energy supplied to radiators $A'$ and $A''$. When the system is thus realigned, output network 29 responds to the reappearance of a signal from mixers 23 and/or 24 by informing the coupling network 41 that gate-control circuit 42 is to reopen the signal path between elements $E_2$ and 44. A visual indicator, such as the oscilloscope 54 of FIG. 1, may also be directly controlled by the calculator 29.

Logic circuit 44 stores the information from network 29 to realign the beam group $B_1$, $B_2$, $B_3$, via control circuit 5, after each rotation of the antenna array with the target observed in the same azimuthal position during the preceding sweep, subject to correction of the angle of elevation in the manner just described to allow for a shift in the target position. In this manner, different targets may be individually tracked in different azimuthal positions. Naturally, an adjustment of sweep control 5 to train the multilobe pattern upon a particular target may also be carried out manually by an operator observing the displays on screens 54, 55 of FIG. 1.

Modifications of the systems described and illustrated, readily apparent to persons skilled in the art, are intended to be embraced within the spirit and scope of our invention as defined in the appended claims.

We claim:

1. A radar system comprising a stack of radar antennas of high azimuthal directivity vertically spaced for emitting and receiving microwave radiation in a common vertical plane; a source of pulsed high-frequency carrier oscillations of different carrier frequencies; feed means for connecting said source to said radar antennas, said feed means including individual phase shifters in series with said antennas and adjusted to establish a directive beam pattern in said vertical plane with several narrow lobes respectively due to said carrier frequencies, said lobes having axes inclined at different angles of elevation; control means connected to said phase shifters for concurrently adjusting same to vary said angle of elevation within respective sweep zones; and evaluation means connected to receive incoming wave energy from said antennas by way of said phase shifters.

2. A system as defined in claim 1 wherein said lobes include a central lobe and a pair of flanking lobes, said evaluation means including an output circuit responsive only to echo pulses from said central lobe and circuit means responsive to echo pulses from said flanking lobes for operating said control means to keep said central lobe trained upon a pulse-reflecting target.

3. A system as defined in claim 2 wherein said feed means comprises waveguide means with two output channels for reflected microwave pulses at the frequency of said central lobe received in additive and subtractive phase relationship, respectively, from two vertically spaced groups of said antennas, said output circuit being connected to receive energy from both said channels.

4. A system as defined in claim 3 wherein said waveguide means comprises a waveguide split into two branches merging at a magic-T junction, said output channels being conjugate branches of said junction.

5. A system as defined in claim 3 wherein said waveguide means comprises a pair of parallel waveguides each provided with an individual set of junctions coupling it to each of said antennas by way of the respective phase shifters.

6. A system as defined in claim 1 wherein said feed means comprises an upstanding waveguide with a plurality of junctions connected to said antennas by way of the respective phase shifters.

7. A system as defined in claim 6 wherein said junctions are substantially equispaced along said waveguide.

8. A system as defined in claim 6 wherein said junctions are couplers with different transfer coefficients providing a distribution of microwave amplitude progressively increasing along one portion and decreasing along another portion of said waveguide.

9. A system as defined in claim 1 wherein said stack of radar antennas is provided with a common vertical reflector of parabolically cylindrical shape.

10. A system as defined in claim 1 wherein each of said phase shifters consists of a plurality of digital stages each adapted to introduce a phase shift substantially equal to $\pi$ divided by a power of 2.

11. A system as defined in claim 1, in combination with an azimuthal radar, said antennas being mechanically coupled with said azimuthal radar for rotation about a vertical axis in unison therewith.

12. A system as defined in claim 1 wherein said carrier frequencies and the effective range of adjustment of said phase shifters by said control means are correlated to establish a coherent sectoral scan by said lobes within said vertical plane.

References Cited

UNITED STATES PATENTS

| | | | |
|---|---|---|---|
| 3,016,531 | 1/1962 | Tomiyasu et al. | 343—17.1 |
| 3,258,774 | 6/1966 | Kinsey | 343—100 X |
| 3,274,593 | 9/1966 | Varela et al. | 343—16 |
| 3,344,426 | 9/1967 | Long. | |

RODNEY D. BENNETT, JR., *Primary Examiner.*

JEFFREY P. MORRIS, *Assistant Examiner.*

U.S. Cl. X.R.

343—17.1